(12) United States Patent
Kojima et al.

(10) Patent No.: US 10,857,933 B2
(45) Date of Patent: Dec. 8, 2020

(54) CONTROL APPARATUS AND LIGHTING SYSTEM

(71) Applicant: KOITO ELECTRIC INDUSTRIES, LTD., Shizuoka (JP)

(72) Inventors: Shuhei Kojima, Shizuoka (JP); Yasuyo Kojima, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 0 days.

(21) Appl. No.: 16/626,604

(22) PCT Filed: Jun. 13, 2018

(86) PCT No.: PCT/JP2018/022553
§ 371 (c)(1),
(2) Date: Dec. 26, 2019

(87) PCT Pub. No.: WO2019/003916
PCT Pub. Date: Jan. 3, 2019

(65) Prior Publication Data
US 2020/0122629 A1    Apr. 23, 2020

(30) Foreign Application Priority Data

Jun. 27, 2017 (JP) .................. 2017-125062

(51) Int. Cl.
*B60Q 1/50* (2006.01)
*B60Q 1/08* (2006.01)
*B60Q 1/28* (2006.01)
*B60Q 1/30* (2006.01)

(52) U.S. Cl.
CPC ............... *B60Q 1/085* (2013.01); *B60Q 1/28* (2013.01); *B60Q 1/30* (2013.01); *B60Q 1/50* (2013.01); *B60Q 1/503* (2013.01); *B60Q 2300/33* (2013.01)

(58) Field of Classification Search
CPC ...................................................... B60Q 1/503
See application file for complete search history.

(56) References Cited

U.S. PATENT DOCUMENTS

2014/0049973 A1    2/2014  Adachi et al.

FOREIGN PATENT DOCUMENTS

| JP | 8-169274 A | 7/1996 |
| JP | 2014-19394 A | 2/2014 |
| JP | 2014-120221 | * 6/2014 |
| JP | 2014-120221 A | 6/2014 |

(Continued)

OTHER PUBLICATIONS

International Search Report in International Application No. PCT/JP2018/022553, filed Jun. 13, 2018.

*Primary Examiner* — Sean P Gramling
(74) *Attorney, Agent, or Firm* — Saliwanchik, Lloyd & Eisenschenk

(57) ABSTRACT

A control apparatus according to an embodiment of the present invention includes a controller. The controller that switches between a first control mode for executing lighting control intended for a marker lamp of a railway vehicle and a second control mode for executing lighting control intended for the marker lamp and a display unit disposed in vicinity of the marker lamp in a manner that depends on a travelling state of the railway vehicle.

8 Claims, 12 Drawing Sheets

(56) References Cited

FOREIGN PATENT DOCUMENTS

| | | | |
|---|---|---|---|
| JP | 2014-234130 | * | 12/2014 |
| JP | 2014-234130 | A | 12/2014 |
| JP | 2015-115272 | A | 6/2015 |
| JP | 2016-159704 | A | 9/2016 |
| WO | WO-2012/060340 | A1 | 5/2012 |

* cited by examiner

CONTROL APPARATUS AND LIGHTING SYSTEM

CROSS-REFERENCE TO RELATED APPLICATIONS

This application is the U.S. national stage application of International Patent Application No. PCT/JP2018/022553, filed Jun. 13, 2018, which claims the benefit under 35 U.S.C. § 119 of Japanese Application No. 2017-125062, filed Jun. 27, 2017, the disclosures of each of which are incorporated herein by reference in their entirety.

TECHNICAL FIELD

The present invention relates to a control apparatus that controls vehicle lamp fittings and a lighting system on which this control apparatus is mounted.

BACKGROUND ART

Conventionally, lighting apparatuses individually including a marker lamp such as a head lamp and a display that displays an image of an outer appearance design as vehicle lamp fittings to be mounted on a vehicle are being propagated (e.g., Patent Literature 1).

CITATION LIST

Patent Literature

Patent Literature 1: Japanese Patent Application Laid-open No. 2014-234130

DISCLOSURE OF INVENTION

Technical Problem

In recent years, it is desirable to provide a function of presentation excellent in decorativeness in the lighting apparatus in which the marker lamp is provided with the display as shown in Patent Literature 1.

In view of the above-mentioned circumstances, it is an object of the present invention to provide a control apparatus and a lighting system capable of making the lighting apparatus to have the function of presentation excellent in decorativeness.

Solution to Problem

In order to accomplish the above-mentioned object, a control apparatus according to an embodiment of the present invention includes a controller.

The controller switches between a first control mode for executing lighting control intended for a marker lamp of a railway vehicle and a second control mode for executing lighting control intended for the marker lamp and a display unit disposed in vicinity of the marker lamp in a manner that depends on a travelling state of the railway vehicle.

With this configuration, a light-emitting mode of the marker lamp and a display mode of the display unit on which a moving image, color information, and the like are displayed operate together in a manner that depends on a situation of the railway vehicle. In this manner, the railway vehicle can be made to have the function of presentation excellent in decorativeness.

The controller may cause some or all of the plurality of light sources of the marker lamp to light up as the first control mode and cause the plurality of light sources and the display unit to light up as the second control mode on the basis of an output of the detector configured to be capable of detecting the travelling state of the railway vehicle.

The controller may cause some of the plurality of light sources to light up and cause the other light sources to blink as the second control mode on the basis of an output of the detector configured to be capable of detecting entry of the railway vehicle into a station.

With this configuration, both of a head light function of the marker lamp and the function of presentation excellent in decorativeness can be achieved.

The controller may cause the plurality of light sources to blink and cause the display unit to display a moving image, color information, or character information the second control mode on the basis of an output of the detector configured to be capable of detecting a stop of the railway vehicle.

With this configuration, for example, the railway vehicle which has stopped at the station can be made to have the function of presentation more excellent in decorativeness and entertainment properties for vehicle users outside the vehicle can be improved.

The controller may cause some of the plurality of light sources to light up in red as the second control mode on the basis of an output of an abnormality detector configured to be capable of detecting an abnormality of the railway vehicle.

With this configuration, it is possible to effectively perform warning outside the vehicle, the warning indicating that the abnormality has occurred in the railway vehicle.

The controller may further cause the display unit to light up in red on the basis of an output of the abnormality detector.

The controller may further cause the display unit to display character information depending on the abnormality of the railway vehicle on the basis of an output of the abnormality detector.

The controller may further execute lighting control of an illumination provided in an entire lateral surface of the railway vehicle in a manner that depends on the travelling state of the railway vehicle.

With this configuration, the line color of the railway vehicle 1 can be changed in a manner that depends on the travelling state of the vehicle.

In order to accomplish the above-mentioned object, a lighting system according to an embodiment of the present invention includes a lighting apparatus and a control apparatus.

The lighting apparatus includes a marker lamp including a plurality of light sources and a display unit disposed in vicinity of the plurality of light sources, the lighting apparatus being mounted on a railway vehicle.

The control apparatus includes a controller that switches between a first control mode for executing lighting control intended for the marker lamp and a second control mode for executing lighting control intended for the marker lamp and the display unit in a manner that depends on a travelling state of the railway vehicle.

The marker lamp may include a front marker lamp or a rear marker lamp of the railway vehicle.

Advantageous Effects of Invention

As described above, in accordance with the present invention, a control apparatus and a lighting system capable of making the lighting apparatus to have the function of presentation excellent in decorativeness can be provided.

MODE(S) FOR CARRYING OUT THE INVENTION

Hereinafter, present embodiments will be described with reference to the drawings. In this embodiment, a lighting system intended for a railway vehicle, for example, will be described.

First Embodiment

<Overview of Lighting System>

Figure 1:
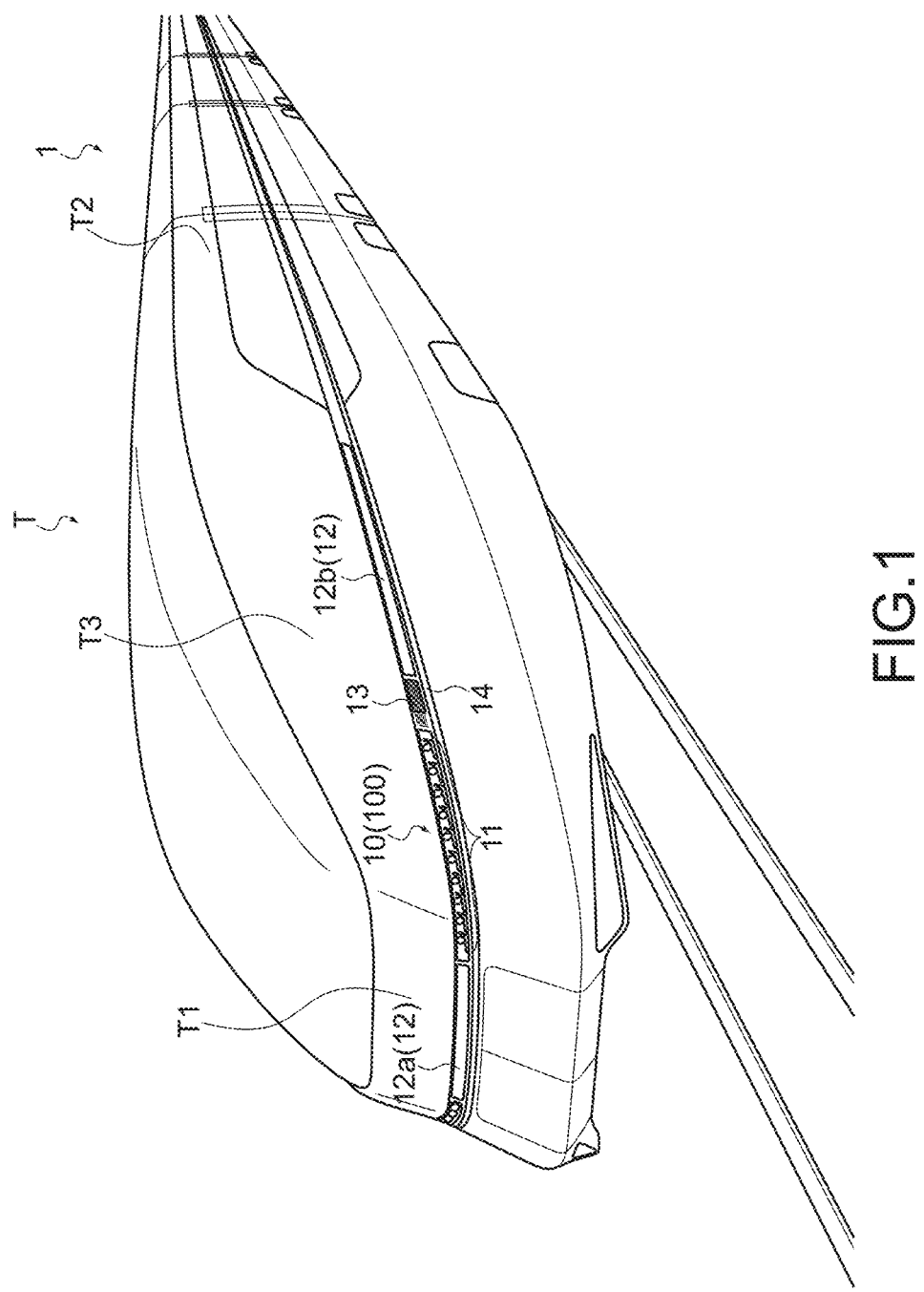
FIG. 1 A diagram showing an example of a railway vehicle to which a lighting system according to a first embodiment of the present invention is applied.
Figure 2:
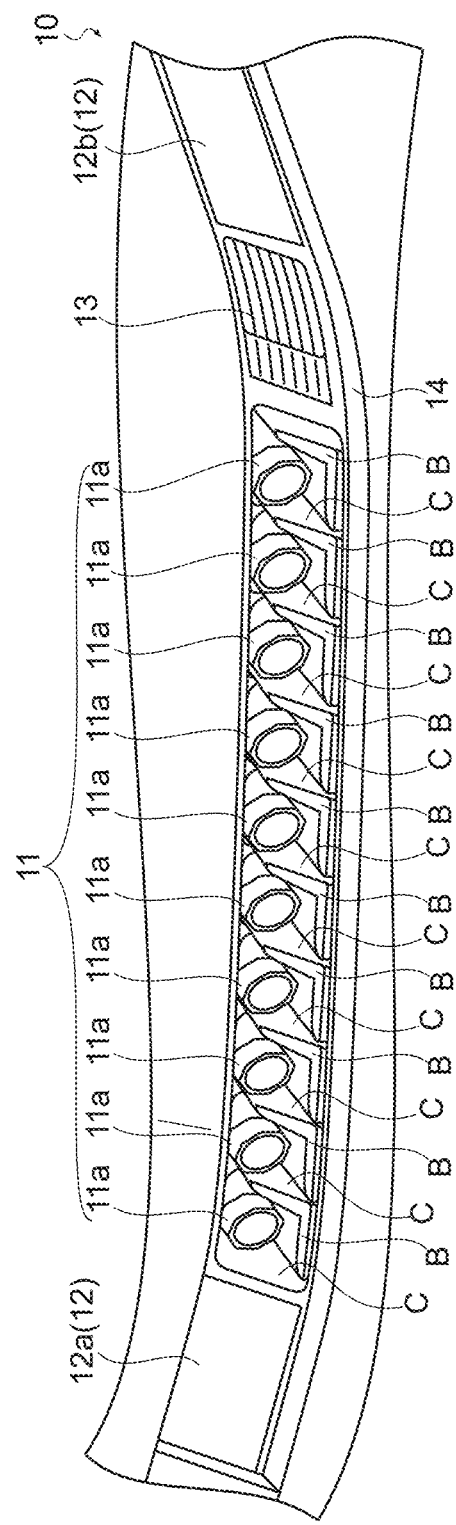
FIG. 2 A perspective view showing a configuration example of the lighting system.

FIG. 1 is a diagram showing a railway vehicle 1 to which a lighting system 100 according to this embodiment is applied. FIG. 2 is a diagram showing a lighting apparatus 10 of the railway vehicle 1 in an enlarged state and is a perspective view of the lighting apparatus 10. It should be noted that a configuration of the lighting system 100 is not limited to the following description.

Figure 3:
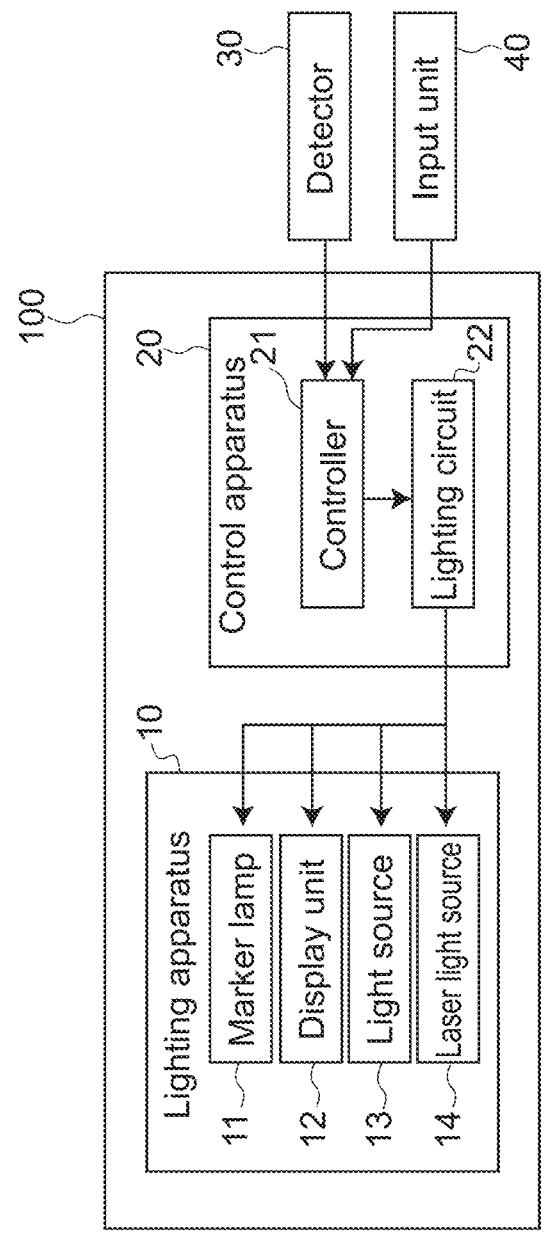
FIG. 3 A block diagram showing a configuration example of the lighting system according to the embodiment.

The lighting system 100 according to this embodiment includes the lighting apparatus 10 and a control apparatus 20 (see FIG. 3). The lighting apparatus 10 is mounted on a first carriage in front in a travelling direction of the railway vehicle 1. Further, the lighting apparatus 10 is covered with a cover (not shown in the figure) for the purpose of enhancing the durability against external shocks, for example.

[Lighting Apparatus]

The lighting apparatus 10 includes marker lamps 11, a display unit 12, auxiliary lights 13, and a laser illumination 14 as shown in FIGS. 1 and 2. Those are provided in the railway vehicle 1 to constitute an identical line over a front surface portion T1 of a first carriage T and both side surface portions T2 and both curved surface portions T3 which are bilaterally symmetric with respect to the front surface portion T1. The marker lamps 11, the auxiliary lights 13, and second display units 12b to be described later thus have configurations bilaterally symmetric with respect to the front surface portion T1.

(Marker Lamp)

The marker lamps 11 according to this embodiment include a plurality of light sources 11a. The plurality of light sources 11a is configured to be capable of emitting illumination light forward in the travelling direction of the railway vehicle 1 and is a front marker lamp (head light) of the railway vehicle 1.

The plurality of light sources 11a is arranged at constant pitch intervals between a first display unit 12a to be described later and the auxiliary lights 13 such that the optical axes of the respective light sources 11a are parallel to the travelling direction of the railway vehicle 1 while the plurality of light sources 11a conforms to the curved surface portions T3 between the front surface portion T1 and the side surface portions T2 of the first carriage T.

Further, the plurality of light sources 11a is respectively arranged within cells C divided by L-shaped partition plates B as shown in FIG. 2. The partition plates B may be made of a material having light reflectance for the purpose of improving the directivity of light emitted by the light sources 11a, for example.

The light sources 11a according to this embodiment can be light emitting diode (LED) light sources, for example. In this case, the type of the LED light sources is not particularly limited. For example, a lead frame type, a FLUX type, a surface mount type (SMD), a COB type, or the like may be employed.

The number of light sources 11a provided in the railway vehicle 1 is not particularly limited and may be one or more. The number of light sources 11a according to this embodiment is 20 and ten light sources 11a are provided in each of both the curved surface portions T3 of the railway vehicle 1. The color of illumination light emitted by the light sources 11a is also not particularly limited. The color of illumination light emitted by the light sources 11a is typically white. Alternatively, the color of illumination light emitted by the light sources 11a is determined as appropriate depending on specifications and purposes of the lighting apparatus 10. For example, the color of illumination light emitted by the light sources 11a may be yellow, green, blue, red, pink, orange, or the like. It should be noted that the curved surface portions T3 in which the marker lamps 11 are arranged may be flat portions. In a case where the marker lamps 11 are used as a rear marker lamp (tail lamp), the light sources 11a typically emit red illumination light.

(Display Unit)

The display unit 12 is constituted by the first display unit 12a and the second display units 12b. The first display unit 12a is disposed on the front surface (front surface portion T1) in the travelling direction of the railway vehicle 1 between one marker lamps 11 and the other marker lamps 11 mounted on the first carriage T. The first display unit 12a has an image display screen as a front surface and is configured to be capable of displaying color information, moving images (animation), still images, character information, and the like.

The first display unit 12a is typically an LED display, though not limited thereto. Any type of display such as a liquid-crystal display and an organic EL display can be employed.

The second display units 12b are disposed on the curved surface portions T3 between the auxiliary lights 13 and the side surface portions T2, conforming to the curved surface portions T3. Each of the second display units 12b has an image display screen as a front surface as in the first display unit 12a and is configured to be capable of displaying color information, moving images (animation), still images, character information, and the like.

The second display unit 12b is typically an LED display, though not limited thereto. Any type of display such as a liquid-crystal display and an organic EL display can be employed.

(Auxiliary Light)

Each of the auxiliary lights 13 is disposed on the curved surface portion T3 between the marker lamps 11 and the second display unit 12b and are configured to be capable of emitting illumination light. The auxiliary light 13 is a stop position illumination that functions as an indication when the railway vehicle 1 stops at a station, for example.

The auxiliary light 13 can be an LED light source, for example. In this case, the LED light source of the above-mentioned type can be employed. The color of illumination light emitted by the auxiliary light 13 is not particularly limited. The color of illumination light emitted by the auxiliary light 13 is determined as appropriate depending on specifications and purposes of the lighting apparatus 10. The color of illumination light emitted by the auxiliary light 13 may be white, yellow, green, blue, red, pink, orange, or the like, for example.

(Laser Illumination)

The laser illumination 14 is substantially continuously provided in the entire periphery (entire lateral surface) of the railway vehicle 1 vertically below the marker lamps 11, the display unit 12, and the auxiliary lights 13, as shown in FIG. 1, and is configured to be capable of emitting illumination light.

The laser illumination 14 according to this embodiment is configured as a laser illumination that radiates laser light having various wavelengths, which is a laser illumination with a plurality of optical fibers packaged in a tubular shape.

The type of optical fibers that constitute the laser illumination 14 is not particularly limited. For example, any type of optical fibers such as multi-mode fibers, single-mode fibers, double cladding fibers, and photonic crystal fibers can be employed.

Further, the color of illumination light emitted by the laser illumination 14 is also not particularly limited. The color of illumination light emitted by the laser illumination 14 is determined as appropriate depending on specifications and purposes of the lighting apparatus 10. For example, the color of illumination light emitted by the laser illumination 14 may be white, yellow, green, blue, red, pink, orange, or the like.

[Control Apparatus]

FIG. 3 is a block diagram showing a configuration example of the lighting system 100. The control apparatus 20 includes a controller 21 and a lighting circuit 22 as shown in the figure.

(Control Unit)

The controller 21 includes hardware required for a computer, such as a central processing unit (CPU), a read only memory (ROM), a random access memory (RAM), and a hard disk drive (HDD). The CPU causes the lighting apparatus 10 to execute lighting patterns based on first and second control modes to be described later by loading a program stored in the ROM or HDD into the RAM and executing the loaded program.

The program is installed in the control apparatus 20 via various storage media (internal memories), for example. Alternatively, the program may be installed via the Internet or the like. In this embodiment, a microcomputer or the like, for example, is used as the control apparatus 20. Alternatively, any other computer may be used.

The controller 21 according to this embodiment controls the lighting apparatus 10 on the basis of an output of a detector 30 configured to be capable of detecting a travelling state of the railway vehicle 1. With this configuration, depending on the travelling state of the railway vehicle 1, the controller 21 causes some or all of the plurality of light sources 11a to light up on the first control mode and causes the plurality of light sources 11a and the display unit 12 to light up on the second control mode, as will be described later.

In this case, the controller 21 executes control on the laser illumination 14 on the basis of an output of the detector 30, for example, to change the line color of the railway vehicle 1 in a manner that depends on the travelling state of the vehicle. It should be noted that the controller 21 is not limited to the output of the detector 30 and is also capable of controlling the lighting apparatus 10 on the basis of traffic data in which the travelling state of the railway vehicle 1 is recorded.

The detector 30 is provided in the railway vehicle 1 and is connected to control apparatus 20 wirelessly or wired. The detector 30 is a monitoring sensor configured to be capable of detecting the travelling state of the railway vehicle 1 (travelling, stop, entering the station, or the like), the amount of movement (travelling distance or the like), and the like, for example.

In this embodiment, a wheel speed sensor capable of detecting the r.p.m. or the like of the wheels of the railway vehicle 1, a speed sensor capable of detecting the speed of the railway vehicle 1, or the like can be employed as the monitoring sensor, though not limited thereto.

For example, the monitoring sensor may be a global positioning system (GPS) sensor capable of detecting a current location of the railway vehicle 1 with radio waves from an artificial satellite, an open/close sensor capable of detecting open/close of doors of the railway vehicle 1, or the like.

In addition, the controller 21 is also capable of controlling the lighting apparatus 10 on the basis of an output of an input unit 40 for inputting a user's operation. This configuration causes the lighting apparatus 10 to execute a lighting pattern desired by the user. An operation device such as a touch panel and a keyboard, for example, is employed as the input unit 40.

(Lighting Circuit)

The lighting circuit 22 is constituted by a switching element that switches lighting/extinguishing of the lighting apparatus 10 and the like. The lighting circuit 22 switches ON/OFF of a switching element corresponding to each of the marker lamps 11, the display unit 12, the auxiliary lights 13, and the laser illumination 14 in accordance with a control signal output by the controller 21. With this configuration, lighting/extinguishing of each of the marker lamps 11, the display unit 12, the auxiliary lights 13, and the laser illumination 14 is controlled.

<Control Method>

Figure 4:
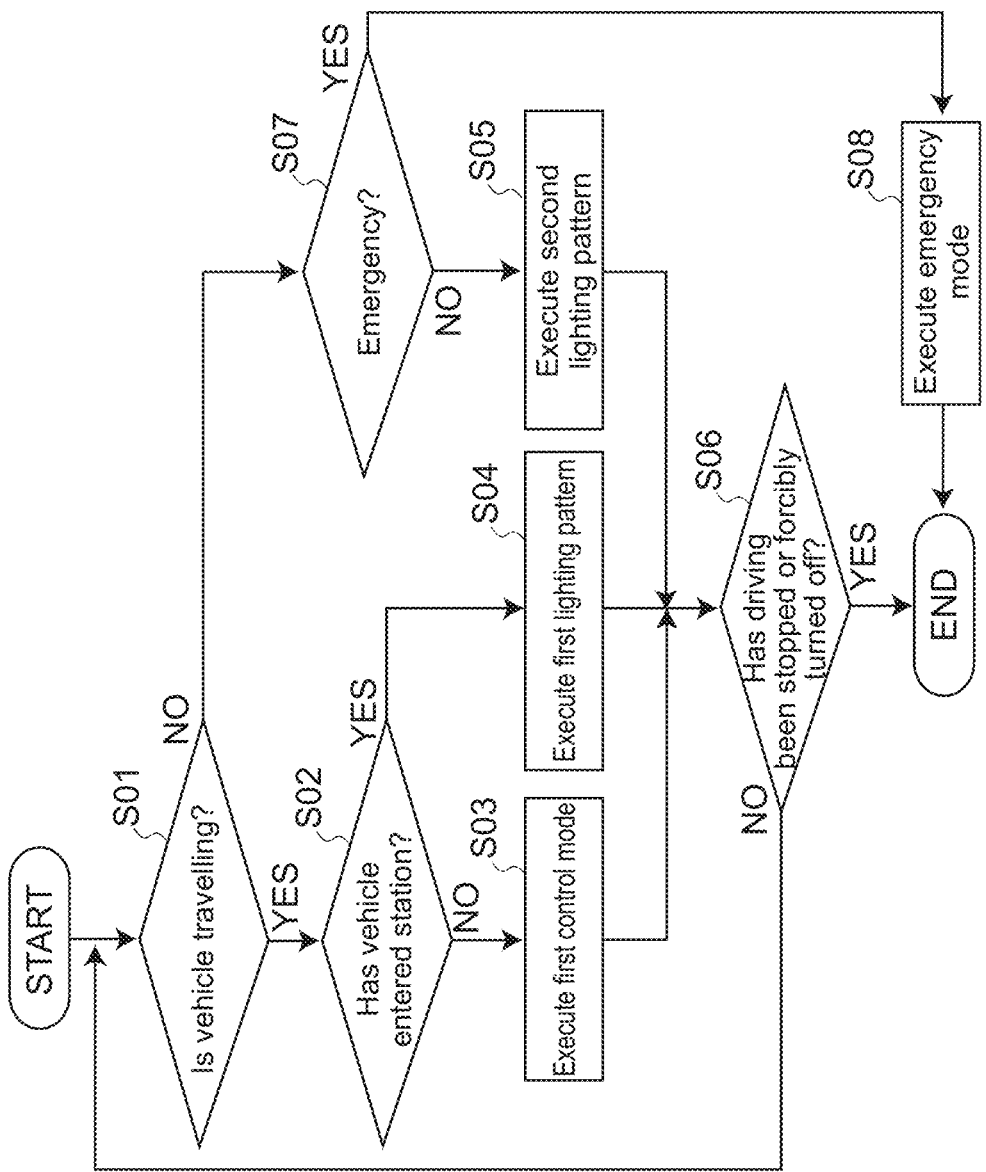
FIG. 4 A flowchart showing a control method of a control apparatus according to the embodiment.

Next, a control method of the control apparatus 20 will be described. FIG. 4 is a flowchart showing a method in which the control apparatus 20 controls the lighting apparatus 10.

The control apparatus 20 according to this embodiment performs control to switch, in accordance with the travelling state of the railway vehicle 1, the first control mode on which lighting control intended for the marker lamps 11 of the railway vehicle 1 is executed and the second control mode on which lighting control intended for the marker lamps 11 and the display unit 12 is executed.

[First Control Mode]

First of all, the detector 30 monitors whether or not the railway vehicle 1 is travelling (S01). Subsequently, in a case where the detector 30 detects a travelling state of the railway vehicle 1 (YES in S01), whether or not the railway vehicle 1 has entered the station is monitored (S02). At this time, the controller 21 determines whether or not the railway vehicle 1 is in the travelling state on the basis of an output of the detector 30 which is obtained by detecting the speed of the railway vehicle 1, the r.p.m. of the wheels, or the like, for example.

Figure 5:
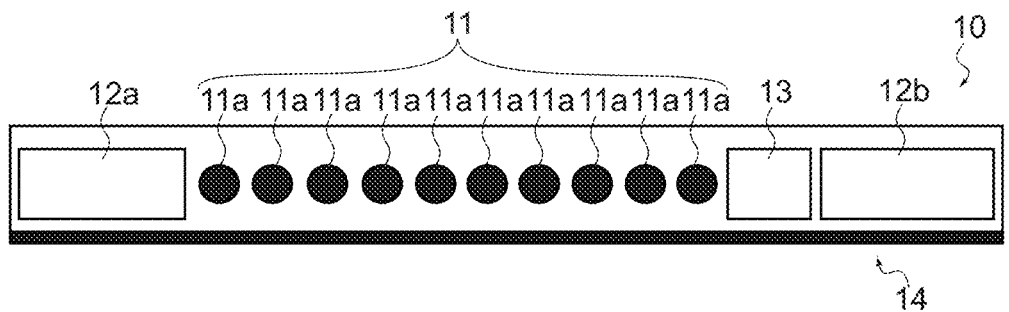
FIG. 5 A diagram showing a lighting pattern based on a first control mode of the control apparatus.
Figure 6:
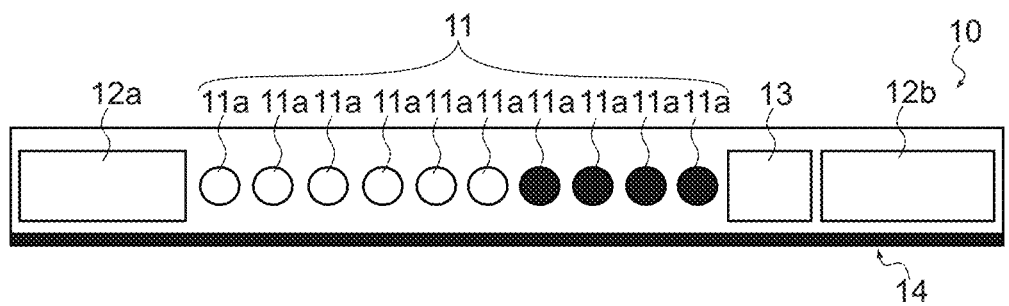
FIG. 6 A diagram showing a lighting pattern based on the first control mode of the control apparatus.

Subsequently, in a case where the detector 30 has not detected that the railway vehicle 1 has entered the station (NO in S02), the first control mode is executed (S03). FIGS. 5 and 6 are schematic views in which the lighting apparatus 10 is simplified and are diagrams each showing the lighting pattern based on the first control mode.

(1) Application Example 1

In this embodiment, all the plurality of light sources 11a and the laser illumination 14 light up in white and the auxiliary light 13 is extinguished as the first control mode (see FIG. 5). With this operation, a high beam is configured. That is, illumination light is emitted forward in the travelling direction of the railway vehicle 1 at a high output. A head light function of the railway vehicle 1 is realized. It should be noted that in Application Example 1, arbitrary information such as a moving image, color information, and character information may be displayed on the display unit 12.

(2) Application Example 2

Further, on the first control mode, only four of the light sources 11a, which are closer to the auxiliary light 13, and the laser illumination 14 may light up in white and the display unit 12 and the auxiliary light 13 may be extinguished (see FIG. 6). With this operation, a low beam is configured. That is, the output of the illumination light is lower than the above-mentioned high beam or the optical axis is changed.

It should be noted that on the first control mode, the color of illumination light of the auxiliary light 13 and the laser illumination 14 is not limited to the above-mentioned color as a matter of course. Further, the black shown in FIGS. 5 and 6 indicates white lighting and the same applies to the following figures.

[Second Control Mode]

(Lighting Pattern 1)

First of all, the detector 30 monitors whether or not the railway vehicle 1 is travelling (S01). Subsequently, in a case where the detector 30 has detected the travelling state of the railway vehicle 1 (YES in S01), whether or not the railway vehicle 1 has entered the station is monitored (S02).

Subsequently, in a case where the detector 30 has detected that the railway vehicle 1 has entered the station (YES in S02), a first lighting pattern based on the second control mode is executed (S04). At this time, the controller 21 determines whether or not the railway vehicle 1 has entered the station on the basis of an output of the detector 30, the output being obtained by detecting that the railway vehicle 1 has decelerated to a predetermined speed and has traveled by a predetermined distance (travelling distance from the station), for example.

Figure 7:
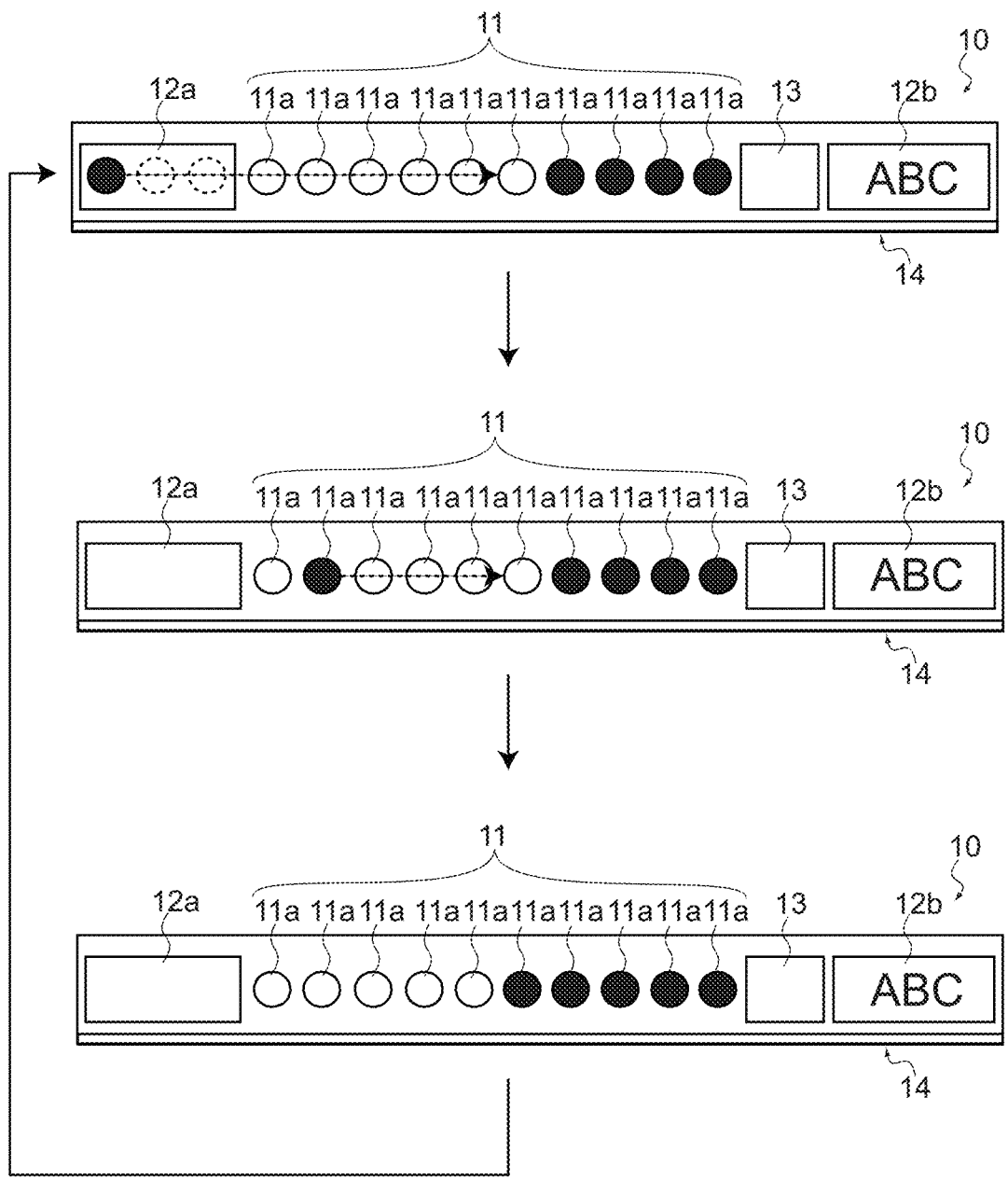
FIG. 7 A diagram showing a lighting pattern based on a second control mode of the control apparatus.

FIG. 7 is a schematic view in which the lighting apparatus 10 is simplified and is a diagram showing the first lighting pattern. In this embodiment, some of the plurality of light sources 11a are caused to light up and the other light sources are caused to blink as the first lighting pattern.

Specifically, only four of the light sources 11a, which are closer to the auxiliary light 13, light up in white and white blinking is repeated to the sixth light source 11a numbered from a side closer to the first display unit 12a so as to sequentially flow toward the sixth light source 11a from the first display unit 12a (see FIG. 7).

At this time, light-emitting imitating the light-emitting mode of the light sources 11a is executed on the first display unit 12a and the character information, for example, is displayed on the second display unit 12b. Further, the auxiliary light 13 switches from green blinking to lighting and the laser illumination 14 blinks in blue. It should be noted that the character information displayed on the first display unit 12a shown in FIG. 7 is an example and the present invention is not limited to this character information.

By causing the lighting apparatus 10 to apply the first lighting pattern, both of the head light function of the marker lamps 11 and a function of presentation excellent in decorativeness can be achieved when the railway vehicle 1 enters the station. It should be noted that in the first lighting pattern, the color of illumination light of the light sources 11a, the first display unit 12a, the auxiliary lights 13, and the laser illumination 14 is not limited to the above-mentioned color as a matter of course.

(Lighting Pattern 2)

First of all, the detector 30 monitors whether or not the railway vehicle 1 is travelling (S01). Subsequently, in a case where the detector 30 has not detected that the railway vehicle 1 is travelling (NO in S01), whether or not the railway vehicle is in an emergency situation is determined (S07). Details of the emergency mode will be described later.

Subsequently, in a case where the railway vehicle 1 determines that the railway vehicle is not in the emergency situation (NO in S07), a second lighting pattern based on the stop of the railway vehicle 1 is executed as the second control mode (505). At this time, the controller 21 determines whether or not the railway vehicle 1 has stopped at the station on the basis of an output of the detector 30, the output being obtained by detecting that rotation of the wheels of the railway vehicle 1 has stopped or the doors have been opened, for example.

Figure 8:
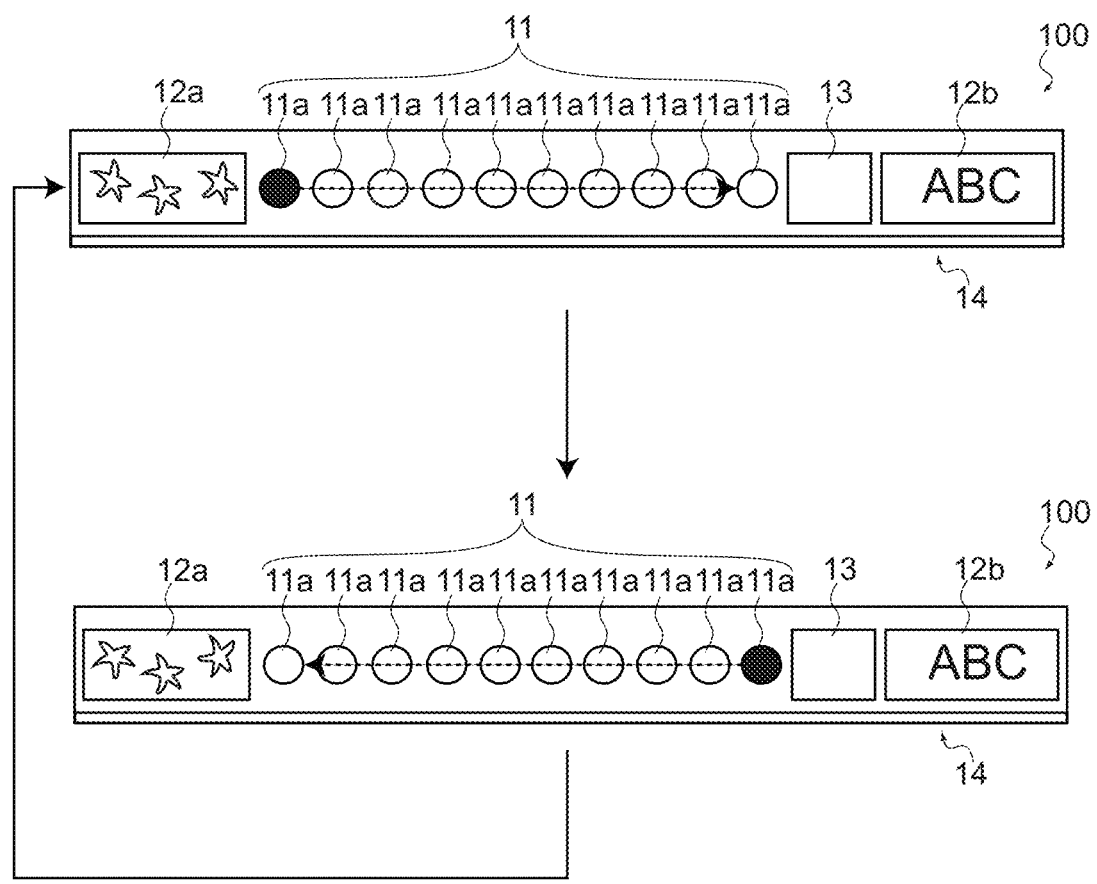
FIG. 8 A diagram showing a lighting pattern based on the second control mode of the control apparatus.
Figure 9:
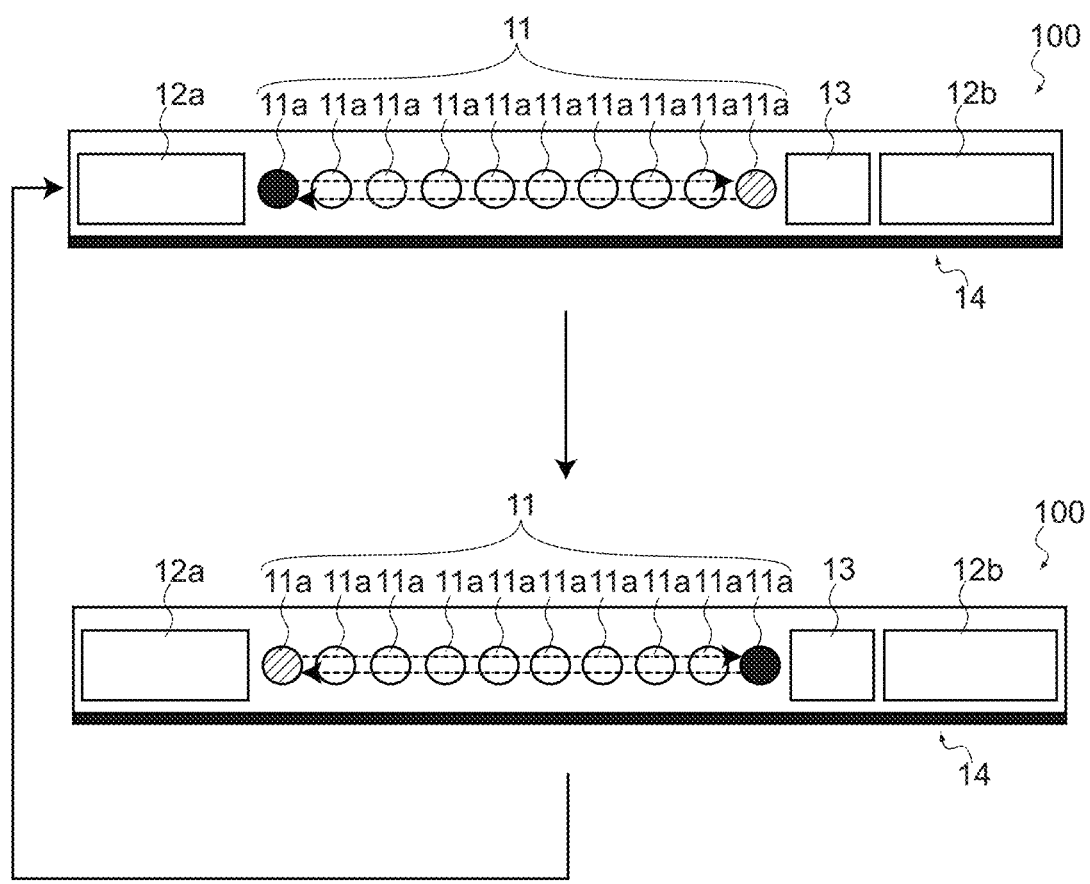
FIG. 9 A diagram showing a lighting pattern based on the second control mode of the control apparatus.

FIGS. 8 and 9 are schematic views in which the lighting apparatus 10 is simplified and are diagrams each showing the second lighting pattern. In this embodiment, the plurality of light sources 11a is caused to blink and first and second display units 12a and 12b are caused to display a moving image and character information, respectively, as the second lighting pattern.

(1) Application Example 1

Specifically, in all of the plurality of light sources 11a, white blinking which moves toward the auxiliary light 13 from the side closer to the first display unit 12a and moves back to the side closer to the first display unit 12a is repeated so as to sequentially flow (see FIG. 8). At this time, the auxiliary light 13 is extinguished and the laser illumination 14 blinks in blue. In this case, color information whose color is changed in the order of green, blue, orange, and white may be displayed on the first and second display units 12a and 12b and so-called fade-in control in which the color of the laser illumination 14 gradually changes in the above-mentioned order may be executed.

(2) Application Example 2

Alternatively, in all of the plurality of light sources 11a, the light-emitting mode on which white blinking which moves toward the auxiliary light 13 from the side closer to the first display unit 12a and moves back to the side closer to the first display unit 12a is repeated so as to sequentially flow and the light-emitting mode on which red blinking which moves toward the first display unit 12a from a side closer to auxiliary light 13 and moves back to the side closer to the auxiliary light 13 is repeated so as to sequentially flow may be concurrently performed (see FIG. 9). At this time, the first and second display units 12a and 12b and the auxiliary light 13 are extinguished and the laser illumination 14 lights up in pink.

(3) Application Example 3

Alternatively, pink lighting/blinking in which all of the plurality of light sources 11a and the first and second display units 12a and 12b are synchronized may be executed or all of the plurality of light sources 11a may light up in pink and moving images may be displayed on the first and second display units 12a and 12b. At this time, the laser illumination 14 lights up in pink and then is gradually extinguished (so-called fade out control) and the auxiliary light 13 is extinguished.

By applying the second lighting pattern to the lighting apparatus 10, for example, the railway vehicle 1 which has stopped at the station can be made to have a function of presentation more excellent in decorativeness and entertainment properties for vehicle users outside the vehicle can be improved.

[Emergency Mode]

First of all, the detector 30 monitors whether or not the railway vehicle 1 is travelling (S01). Subsequently, in a case where the detector 30 has not detected that the railway vehicle 1 is travelling (NO in S01), whether or not the railway vehicle 1 is in the emergency situation is determined (S07).

At this time, the controller 30 determines that the railway vehicle 1 is in the emergency situation on the basis of an input made by a member of a crew via the input unit 40 in a case where the railway vehicle 1 has stopped due to a malfunction, for example.

Subsequently, in a case where it is determined that the railway vehicle 1 is in the emergency situation (YES in S07), a light-emitting pattern similar to an abnormal lighting pattern to be described later is executed as the emergency mode (see FIG. 12).

In this embodiment, control to switch between the first control mode and the second control mode is executed until driving of the railway vehicle 1 is stopped or forcibly turned off (S06).

It should be noted that in the second lighting pattern, the color of illumination light of the light sources 11a, the first and second display units 12a and 12b, the auxiliary light 13, and the laser illumination 14 are not limited to the above-mentioned color as a matter of course. Further, hatching shown in FIG. 9 indicates red lighting and the same applies to the following figures.

Second Embodiment

Figure 10:
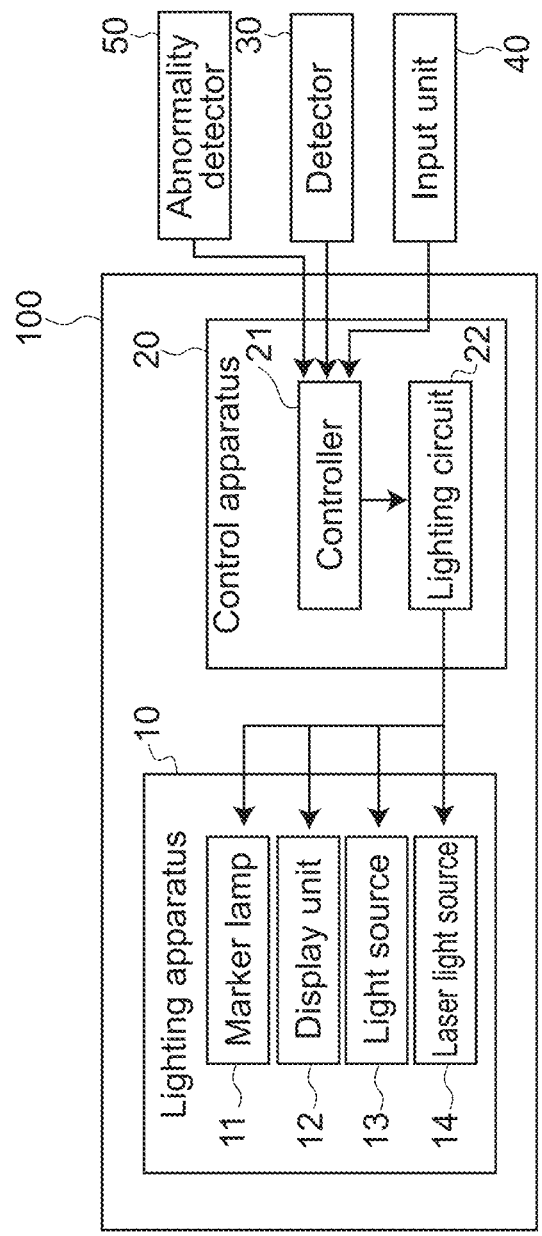
FIG. 10 A block diagram showing a configuration example of a lighting system according to a second embodiment of the present invention.

FIG. 10 is a block diagram showing a configuration example of the lighting system 100 according to this embodiment. Hereinafter, configurations similar to those of the first embodiment will be denoted by similar reference signs and detailed descriptions thereof will be omitted.

In this embodiment, the lighting system 100 is different from the first embodiment in that the controller 21 is configured to be capable of performing control on the basis of an output of an abnormality detector 50.

The abnormality detector 50 is a sensor configured to be capable of detecting an abnormality of the railway vehicle 1 and informing the controller 21 of the abnormality on the basis of information received from the railway vehicle 1, for example. As will be described later, the control apparatus 20 executes the lighting pattern described in the first embodiment in a case where the abnormality has not been detected at the abnormality detector 50 and executes a lighting pattern according to the abnormality of the railway vehicle 1 in a case where the abnormality has been detected.

In this embodiment, a vibration sensor capable of detecting vibrations of the railway vehicle 1, a sensor capable of detecting malfunction information of the detector 30, or the like can be employed as the above-mentioned sensor (abnormality detector 50), for example, though any type of sensor can be employed.

<Control Method>

Figure 11:
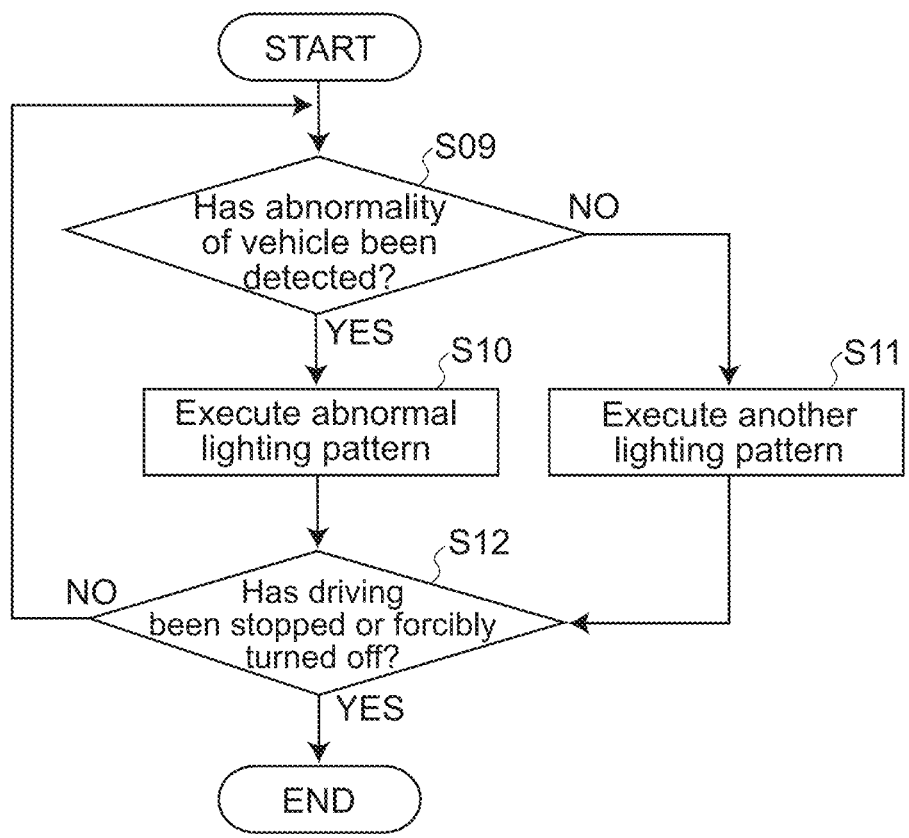
FIG. 11 A flowchart showing a control method of a control apparatus according to the embodiment.

Next, a control method of the control apparatus 20 according to this embodiment will be described. FIG. 11 is a flowchart showing a method in which the control apparatus 20 controls the lighting apparatus 10.

[Second Control Mode]

(Other Lighting Patterns) First of all, the abnormality detector 50 monitors the presence/absence of an abnormality of the railway vehicle 1 (S09). Subsequently, in a case where the abnormality detector 50 has not detected the abnormality of the railway vehicle 1 (NO in S09), the lighting pattern described in the above-mentioned first embodiment is executed (S11)

(Abnormality Lighting Pattern)

On the other hand, in a case where the abnormality detector 50 has detected the abnormality of the railway vehicle 1 (YES in S09), the abnormal lighting pattern based on the abnormality of the railway vehicle 1 is executed as the second control mode (S10). At this time, the controller 21 determines whether or not the abnormality has occurred in the railway vehicle 1 on the basis of an output of the abnormality detector 50, the output being obtained by detecting an abnormality of a power system, pantographs, or the like of the railway vehicle 1, abnormal vibrations, or the like, for example.

It should be noted that in this embodiment, in a case where an emergency situation (abnormality) has occurred in the interior in the railway vehicle 1 or a passenger or the like, the abnormal lighting pattern to be described later may be executed on the basis of an input via the input unit 40 made by a vehicle user (member of the crew or passenger) himself or herself.

In this embodiment, control to switch between the abnormal lighting pattern and another lighting pattern is executed until driving of the railway vehicle 1 is stopped or forcibly turned off (S12). Hereinafter, details of the abnormal lighting pattern will be described.

Figure 12:
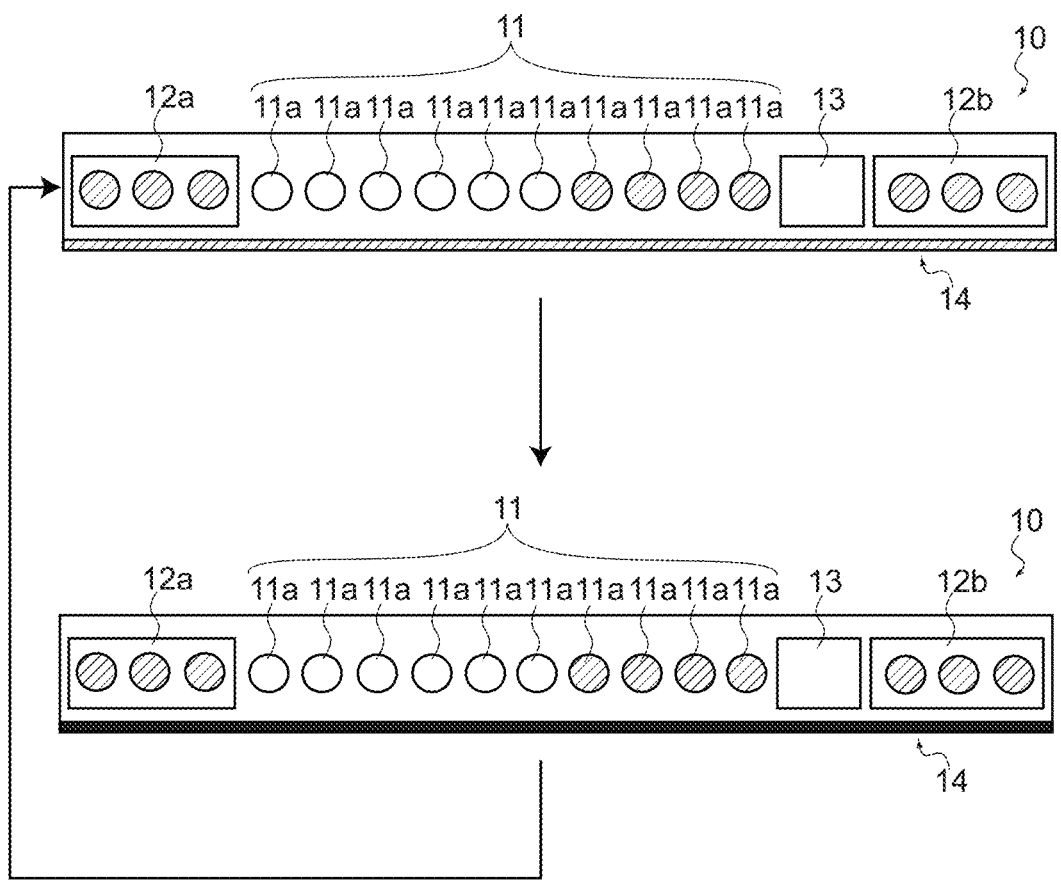
FIG. 12 A diagram showing a lighting pattern based on the second control mode of the control apparatus.

FIG. 12 is a schematic view schematically showing the lighting apparatus 10 and is a diagram showing the abnormal lighting pattern. In this embodiment, as the abnormal lighting pattern, some of the plurality of light sources 11a and the first and second display units 12a and 12b light up in red.

Specifically, a light-emitting mode on which only four of the light sources 11a, which are closer to the auxiliary light 13, light up in red, the six light sources 11a other than those light sources 11a blink in white, and then blinking white at higher speed is repeated.

At this time, light emission imitating the light-emitting mode of the light sources 11a is executed on the first and second display units 12a and 12b. Further, the auxiliary light 13 is extinguished, the laser illumination 14 lights up in red for blinking of the light sources 11a and lights up in white for high-speed blinking. In this case, character information such as "emergency stop" and "STOP", a figure, and the like may be displayed on the first and second display units 12a and 12b.

By causing the lighting apparatus 10 to apply the abnormal lighting pattern, it is possible to effectively perform warning outside the vehicle, the warning indicating that the abnormality has occurred in the railway vehicle 1. It should be noted that in the abnormal lighting pattern, the color of illumination light of the light sources 11a, the first display unit 12a, the auxiliary light 13, and the laser illumination 14 is not limited to the above-mentioned color as a matter of course.

Hereinabove, the embodiments of the present invention have been described. Note that the present invention is not limited only to the above-mentioned embodiments and various modifications can be made as a matter of course.

For example, in the above-mentioned embodiment, the marker lamps 11 in the lighting apparatus 10 are the front marker lamp. Alternatively, the marker lamps 11 in the lighting apparatus 10 may be the rear marker lamp (tail lamp) of the railway vehicle 1 or the above-mentioned lighting patterns may be executed on the lighting apparatus 10 including those rear marker lamp.

Figure 13:
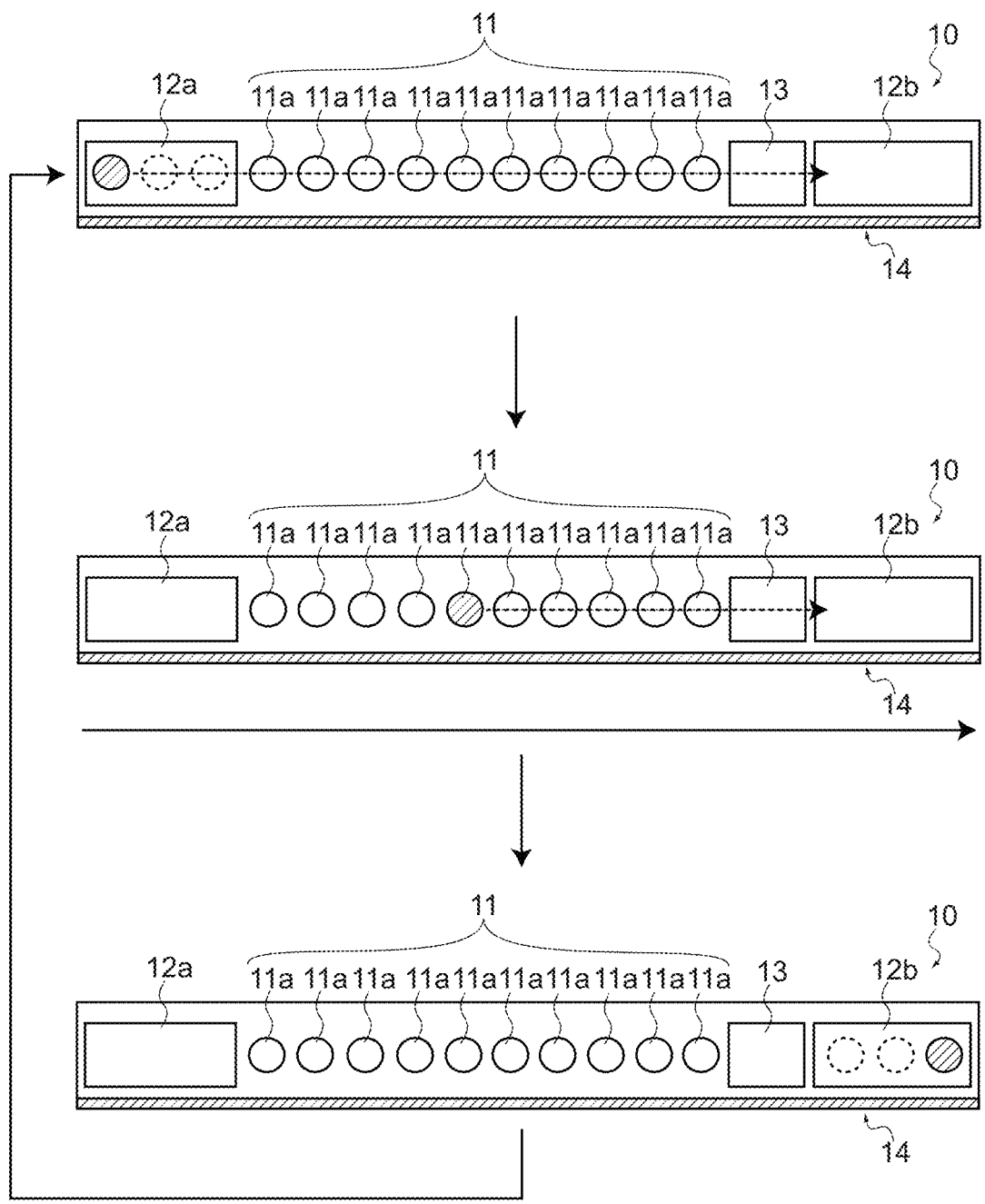
FIG. 13 A diagram showing a lighting pattern based on the first control mode of the control apparatus in a modified example of the present invention.

In this case, a lighting pattern to be described later may be applied to the lighting apparatus 10 including the rear marker lamp and the display unit 12 as the lighting pattern based on the first control mode described in the above-mentioned embodiment. FIG. 13 is a diagram showing the lighting pattern in the modified example of the present invention.

In this lighting pattern, red blinking which moves toward the second display unit 12b from the first display unit 12a is repeated so as to sequentially flow on all of the plurality of light sources 11a (rear marker lamp) and the first and second display units 12a and 12b. At this time, the auxiliary light 13 is extinguished and the laser illumination 14 lights up in red.

With this configuration, the lighting apparatus 10 can be made to have not only the function as the rear marker lamp but also the function of presentation excellent in decorativeness when the railway vehicle 1 is travelling.

Further, in the above-mentioned embodiment, the lighting pattern in which the front marker lamp and the display unit 12 in vicinity of this front marker lamp operate together is executed, though not limited thereto. The lighting pattern in which the lighting apparatus 10 including the front marker lamp and the lighting apparatus 10 including the rear marker lamp operate together may be executed.

In addition, in the above-mentioned embodiment, the first and second display units 12a and 12b that constitute the lighting apparatus 10 and the marker lamps 11 and the auxiliary lights 13 are arranged on the identical line, though not limited thereto. The lay-out may be changed as appropriate depending on specifications and purposes of the lighting apparatus 10.

For example, the first and second display units 12a and 12b may be arranged vertically above or below the marker lamps 11. Alternatively, the plurality of light sources 11a may be arranged on a plurality of lines parallel to the travelling direction of the vehicle.

In addition, the lighting patterns of the lighting apparatus 10 described in the above-mentioned embodiment can be arbitrarily set by the control apparatus 20 and the present invention is not limited to the above-mentioned lighting patterns.

Further, the lighting system 100 according to the embodiment is typically applied to the railway vehicle, though not limited thereto. The lighting system 100 may be applied to all movable objects such as an automobile, a motorcycle, a bicycle, and a watercraft and any applications thereof are possible.

REFERENCE SIGNS LIST 1 railway vehicle
10 lighting apparatus
11 marker lamp
12 display unit
13 auxiliary light
14 laser illumination
20 control apparatus
21 controller
22 lighting circuit
30 detector
40 input unit

The invention claimed is:

1. A control apparatus, comprising:
a controller that switches between a first control mode for executing lighting control intended for a marker lamp of a railway vehicle and a second control mode for executing lighting control intended for the marker lamp and a display unit disposed in vicinity of the marker lamp in a manner that depends on a travelling state of the railway vehicle, the display unit including an image display screen and the marker lamp comprising a plurality of light sources
wherein the controller causes some or all of the plurality of light sources of the marker lamp to light up as the first control mode and causes the plurality of light sources and the display unit to light up as the second control mode on a basis of an output of a detector configured to be capable of detecting the travelling state of the railway vehicle, and
wherein the controller causes some of the plurality of light sources to light up and causes the other light sources to blink as the second control mode on a basis of an output of the detector configured to be capable of detecting entry of the railway vehicle into a station.

2. The control apparatus according to claim 1, wherein the controller causes the plurality of light sources to blink and causes the display unit to display a moving image, color information, or character information the second control mode on a basis of an output of the detector configured to be capable of detecting a stop of the railway vehicle.

3. The control apparatus according to claim 1, wherein the controller causes some of the plurality of light sources to light up in red as the second control mode on a basis of an output of an abnormality detector configured to be capable of detecting an abnormality of the railway vehicle.

4. The control apparatus according to claim 3, wherein the controller further causes the display unit to light up in red on a basis of an output of the abnormality detector.

5. The control apparatus according to claim 3, wherein
the controller further causes the display unit to display character information depending on the abnormality of the railway vehicle on a basis of an output of the abnormality detector.

6. The control apparatus according to claim 1, wherein
the controller further executes lighting control of an illumination provided in an entire lateral surface of the railway vehicle in a manner that depends on the travelling state of the railway vehicle.

7. A lighting system, comprising:
a lighting apparatus including a marker lamp including a plurality of light sources and a display unit disposed in vicinity of the plurality of light sources, the display unit including an image display screen, the lighting apparatus being mounted on a railway vehicle; and
a control apparatus including a controller that switches between a first control mode for executing lighting control intended for the marker lamp and a second control mode for executing lighting control intended for the marker lamp and the display unit in a manner that depends on a travelling state of the railway vehicle,
wherein the controller causes some or all of the plurality of light sources of the marker lamp to light up as the first control mode and causes the plurality of light sources and the display unit to light up as the second control mode on a basis of an output of a detector configured to be capable of detecting the travelling state of the railway vehicle, and
wherein the controller causes some of the plurality of light sources to light up and causes the other light sources to blink as the second control mode on a basis of an output of the detector configured to be capable of detecting entry of the railway vehicle into a station.

8. The lighting system according to claim 7, wherein
the marker lamp comprises a front marker lamp or a rear marker lamp of the railway vehicle.

* * * * *